United States Patent

[11] 3,575,228

[72] Inventor: Alfred Marzocchi, Cumberland, R.I.
[21] Appl. No. 730,139
[22] Filed May 17, 1968
[45] Patented Apr. 20, 1971
[73] Assignee Owens-Corning Fiberglas Corporation

[54] REINFORCEMENT OF ANNULAR BODIES
13 Claims, 9 Drawing Figs.
[52] U.S. Cl. .................................................. 152/356, 152/359
[51] Int. Cl. ..................................................... B60c 9/06
[50] Field of Search .......................................... 152/359, 356, 354

[56] References Cited
UNITED STATES PATENTS
3,390,714 7/1968 Marzocchi .................. 152/356
FOREIGN PATENTS
757,597 10/1944 Germany ..................... 152/359

Primary Examiner—James B. Marbert
Attorneys—Staelin and Overman and Paul F. Stutz ABSTRACT: An improved tire construction including a yarn reinforcement formed of twisted-together subelements so arranged that the direction of the central slope of the spiral defined by the twist is inclined generally oppositely to the inclination of the yarn or cord body within the annular body.

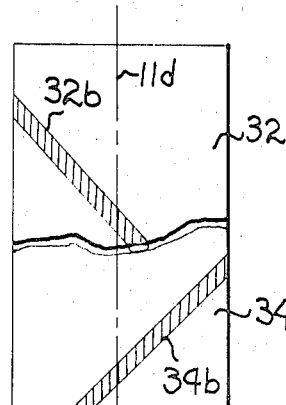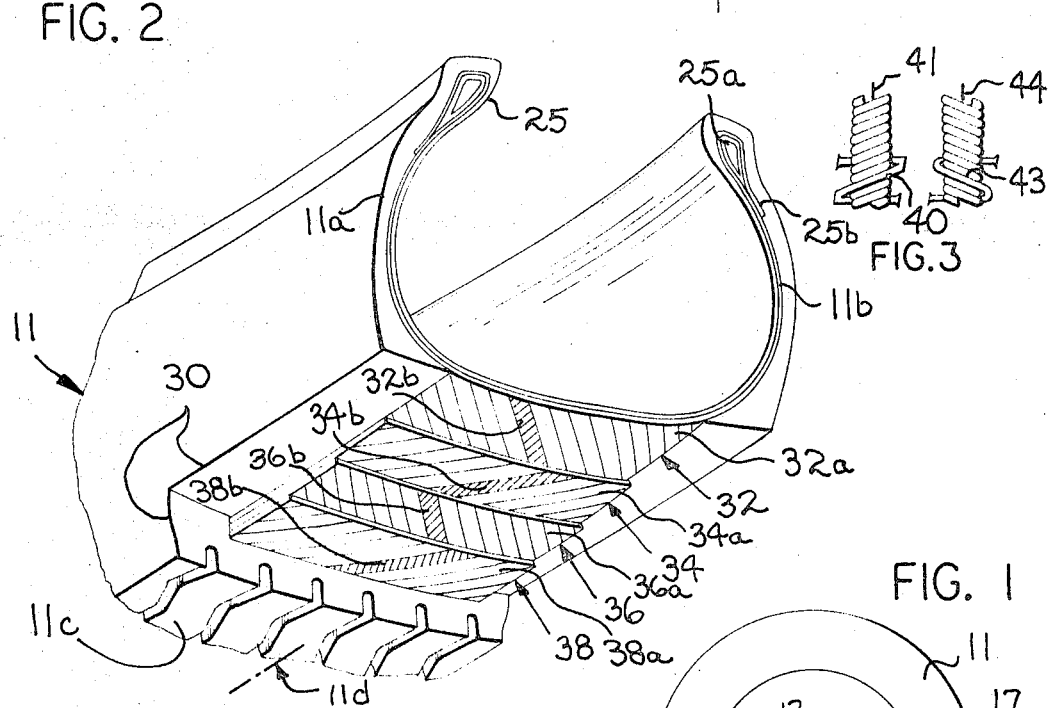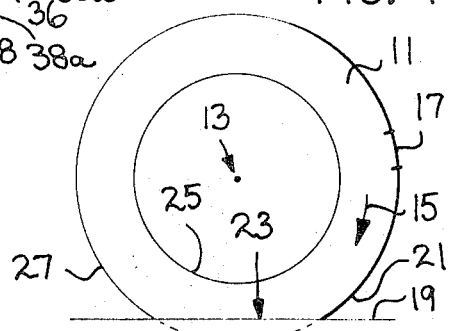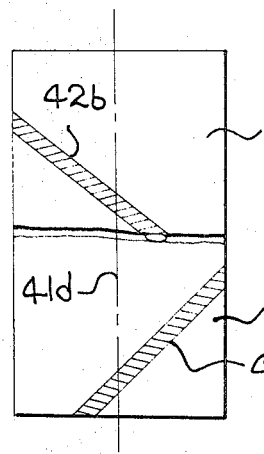

PATENTED APR 20 1971 3,575,228

INVENTOR.
ALFRED MARZOCCHI
BY
*Stachi & Querman*
ATTORNEY 3,575,228

REINFORCEMENT OF ANNULAR BODIES

Yarns and cord structures formed of twisted-together filaments of a variety of materials have been employed in and as interior reinforcements for rubberlike elastomeric bodies such as tires and industrial belts of all kinds. These materials include cotton, rayon, the polyamides such as nylon, the polyester such as Dacron, polypropylene; even fine steel wire and, more recently, glass. These materials all possess inherent advantages in terms of their properties in the application under consideration and, as well, these materials have certain disadvantageous properties. The particular attributes and, as well, the shortcomings of the natural occurring and synthetic materials are well known in the art and will not be gone into in detail herein. Glass as a candidate reinforcement for annular bodies possesses a number of desirable properties. For example, a glass filament (a) possesses essentially 100 percent elasticity, (b) demonstrates essentially no yield under stress, (c) demonstrates excellent dimensional stability and (d) is virtually immune to change in atmospheric conditions, principally moisture and, as well, heat. On the other hand, glass is quite stiff when compared to the conventional organics. Numerically, glass has a stiffness of 322 grams per denier (g.p.d.) while nylon ranges from 18—23 g.p.d., polyesters range from 11—21 g.p.d., the acrylics such as Acrilan and Orlon range from 7—10 g.p.d., viscose rayon varies from 11 to about 25 g.p.d. The low breaking elongation of glass frequently presents some problems. Thus, the value of glass is 3—4 percent whereas the polyesters range from 19—30 percent, nylon ranges from 16—40 percent, the acrylics from 36—40 percent, viscose rayon from 9—30 percent. Glass also has a high specific gravity measuring 2.54 compared to 1.14 for nylon, 1.5 for rayon and from 1.22 to 1.38 for the polyesters such as Kodel and Dacron. Additionally, glass has a toughness value of 0.07 on a denier basis compared to nylon's 0.75, rayon's 0.20, Dacron polyesters' 0.5 and acrylic Orlon's 0.4. It can be appreciated from the foregoing that any contemplation of the use of glass as a reinforcement must proceed on the basis of a consideration of these quite different properties entailing therefore the determination of the ideal geometric, e.g., spatial, location of the glass within the body, either alone or in combination with other materials, in order to achieve an effective and, in some ways, a superior reinforcement.

It is an object of the present invention to provide a novel scheme of reinforcement for pneumatic tires.

It is a particular object of the present invention to provide a reinforcement system which employs twisted-together subelements such as glass and, as well, the other candidate reinforcement materials combined in such fashion and in conjunction with other features of arrangement as provide a maximization in achievement of the inherent property of the material and, as well, a minimization of the not so desirable properties of the candidate reinforcement material.

It is a further object of the present invention to provide tire constructions featuring multiple-ply reinforcement, in which plies the twisted-together yarn reinforcement is so arranged and selected as to provide the optimum in reinforcement considering the property of the particular material employed.

It is also an object of the present invention to provide a system of reinforcement for tires; which system features glass and which presents glass within the body in a manner and arrangement as provides the maximum in terms of the advantageous properties of glass.

The foregoing and, as well, other objects of the present invention will become apparent to those skilled in the art from the following detailed description taken in conjunction with the annexed sheets of drawings on which are presented, for purposes of illustration only, several variant embodiments of the present invention.

IN THE DRAWINGS

FIG. 1 is a schematic side elevation view of a vulcanized tire in load-bearing contact with the pavement of road surface;

FIG. 2 is a three-quarter perspective view of the tire of FIG. 1 with a portion of the tread and carcass broken away in order to more clearly show the interior structure of the tire featuring the reinforcement arrangement in accordance with the present invention;

FIG. 3 is an elevation view of two cord structures of opposite twist assembly;

FIG. 4 is a schematic plan view of two superimposed plies composed of mutually parallel cords and illustrating the present invention;

FIG. 5 is a similar view, but illustrating a construction not of the present invention.

Figure 8:
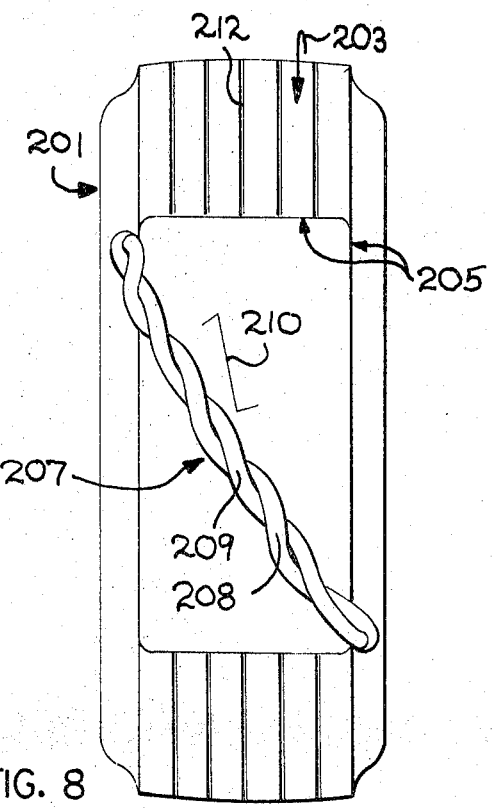
FIGS. 6 through 9 are views looking up at a tire footprint in contact with a transparent surface; the tread being cut away to reveal a schematic representation of a single bias inclined cord; the different views illustrating different twist conditions and different load conditions.

In brief, the reinforcement system in accordance with the present invention envisions that the reinforcement yarn or cord will be composed of a twisted-together array of filaments. Furthermore, the twisted-together yarns or cords are incorporated into the tire, usually in bias or inclined relationship to the peripheral centerline of the tire. Viewed exteriorly, the yarns or cords making up a carcass ply or a belt ply of a tire may be either of left-hand or right-hand inclination to the peripheral centerline. Usually, in multiple-ply constructions, the cords or yarns in adjacent plies are oppositely inclined to the peripheral centerline. In accordance with the reinforcement scheme of the present invention, the cords or yarns composed of twisted-together subelements are selected such that the central portion of the spiral defined by the subelements due to the twist is of opposite "hand" or inclination to the inclination of the cord or yarn disposition within the tire annulus.

Reference should now be had to the drawings in conjunction with the following detailed description for a more complete understanding of the inventive concept.

In FIG. 1, a tire 11 mounted on a wheel (not shown) rotates about an axis 13 in the direction indicated by the arrow 15. Since the tire is under load, the periphery of the tire of any given segment, for example, the segment 17, does not pass in a uniformly circular path. Rather, as the segment approaches the pavement 19, it is subjected to the resistance thereof and may bulge slightly thereof as at 21. Furthermore, the tire when in contact with the pavement as at 23 deflects inwardly toward the bead 25 while that segment of the tire is subjected to compressive load exerted down through the axle, the wheel and the bead. Finally, the segment of the tire moves back outwardly as at 27 to its original position.

Referring now to FIG. 2, the interior structure of the tire 11 can be seen. The tire 11 is composed of spaced beads 25 and 25a connected by a car carcass 11a which extends toroidally from bead 25 to bead 25a. The carcass includes a plurality of carcass plies 11b which extend from bead to bead within the carcass; the cords being turned up about the beads as at 25b. By reason of the cut line 30 extending radially through the tread portion 11c and then parallel with the tread surface, there is disclosed, in the crown region below the tread 11c and above the carcass plies 11b, four belt plies 32, 34, 36 and 38. The belt ply 38 includes a plurality of side-by-side, mutually parallel cords 38a which are of right-hand inclination taken with respect to the peripheral centerline 11d of the tire. The belt ply 36 is composed of a plurality of side-by-side, mutually parallel cords 36a which are oppositely inclined to the cords 38a and thus of left-hand inclination taken with respect to the peripheral centerline 11d of the tire. The belt ply 34 is composed of a plurality of side-by-side, mutually parallel cord or yarn structures 34a in general parallelism with the cords 38a, thus of right-hand inclination. The belt ply 32 is composed of a plurality of side-by-side, mutually parallel cords 32a which are in parallelism with the cords 36a, thus of left-hand inclination oppositely to the right-hand inclination of the cords 34a and 38a. The belt plies 32, 34, 36 and 38 are generally in superimposed relationship, with the innermost belt ply 32 being slightly wider than the other belt plies and each successively outermost ply (34, 36 and 38) being slightly narrower than the one preceding it. In accordance with the present invention, the cords 32a and 36a, of which the belt plies 32 and 36 respectively composed, feature a yarn construction which is of Z-twist configuration while cords 34a and 38a, of which plies 34 and 38 are composed, feature a yarn construction which is of S-twist configuration (see FIG. 3).

In FIG. 3, there are disclosed two yarn structures; the configuration on the left being a Z-twist wherein the central portion of the spiral 40 about the central axis 41 of the yarn conforms in direction of slope with the central portion of the letter Z. The other yarn structure is an S-twist configuration; that is, the central axis 44, conforms in direction of slope with the central portion of the letter S.

Referring now back to FIG. 2, it can be seen that cord 32b features a twist direction (as represented by the parallel angular lines) which defines the central portion of a Z. The remainder of the mutually parallel cords 32a are likewise of Z-twist construction. It can also be seen that the cord 36b in ply 36 features a Z-twist configuration. On the other hand, cords 34b and 38b embody an S-twist configuration as can be seen by comparing the slope of the central portion of the spiral with the description of FIG. 3.

To avoid any misunderstanding as might be caused by the perspective view (FIG. 2), reference may be had to FIG. 4 wherein the reference numeral 32 and the reference numeral 34 will identify the same plies as in FIG. 2, but in a plan view looking through the tread. Also in FIG. 4, the peripheral centerline 11d of the tire is shown as a dotted vertical line. As can be seen, the cord 32b in belt ply 32 features a direction of twist which is characterized as a Z-twist, whereas the cord 34b in belt ply 34 features a direction of twist which is characterized as an S-twist. It may also be seen that the cord 32b itself is of left-hand inclination to the peripheral centerline 11d, while the slope of the cord twist is of right-hand configuration with respect to the cord axis. On the other hand, the cord 34b is of right-hand inclination with respect to the peripheral centerline 11d, whereas the slope of the central portion of the twist is of left-hand configuration taken with respect to the axis of the cord body.

Referring now to FIG. 5, the construction of FIG. 4 has been reproduced with the exception that the cord 42b (corresponding to cord 32b in the embodiment of the invention of FIG. 4) features an S-twist direction. Also, the cord 44b (corresponding to the cord 34b of FIG. 4) features a Z-twist. Another way of looking at the structure of FIG. 5 is to consider that the cord 42b is of left-hand inclination, while the central portion of the spiral defined by the twisted-together elements is also of left-hand inclination contrary to the arrangement of FIG. 4 wherein the cord 32b, while of left-hand inclination with respect to the peripheral centerline, embodies a twist of right-hand inclination. Similarly, referring to cord 44b of FIG. 5, it is of right-hand inclination with respect to the peripheral centerline, while the central portion of the spiral defining the twist is also of right-hand inclination to the cord body contrary to the cord 34b in FIG. 4 wherein the central portion of the S-twist configuration is of left-hand inclination to the cord body. While it is not intended to be bound by any theory, it is believed that the preferred arrangement as illustrated in FIGS. 2 and 4 resides in the fact that the slope of the central portion of the spiral of twisted cords 32b and 34b is more closely in alignment with the peripheral centerline; in contrast to the direction of the slope defined by the twist in the cord constructions 42b and 44b (FIG. 5) which is, in each case, more nearly transverse to the centerline identified in FIG. 5 as 41d.

Improved reinforcement of tire constructions as achieved and exhibited by the proper matching of cord inclinations and direction of twist in accordance with the present invention is similarly achieved in the case of V-belts, conveyor belts and other industrial belts. In these belts, of course, continuous cord reinforcement extends longitudinally through the belt in repeating spirals which are in slightly angular relationship with the longitudinally centerline of the belt. This angularity may be either left-hand or right-hand inclination and accordingly the twist of the cord should be selected so that an S-twist cord will be employed in a cord of right-hand inclination and a Z-twist cord employed in a cord of left-hand inclination.

While it is not intended to be bound by any one theory, several have been advanced. According to one theory, the selection of an S-twist construction for a cord or right-hand inclination with respect to the annular body in which the cord is embedded and the selection of a Z-twist construction for a cord of left-hand inclination with respect to the annular body in which the cord is embedded will result in a closer alignment of the slope of the central portion of the spiral defined by the particular twist and the longitudinal axis of the body. The latter is coincident with the path of any given segment of the annular body in the course of rotation and accounts for improved life of the annular body under service conditions. It would appear that orientation of the slope of the central portion of the spiral, by the proper selection of twist, in closer alignment with the longitudinal axis of the body, considered in its rotational movement, would subject a given length of the filament (or whatever subelement the cord is made up of) more directly to the forces and stresses to which the annular body is exposed. In other words, the cord subelement, by being in close alignment with the longitudinal axis, would also be in alignment with the forces and stresses which the body endures in its rotational movement.

According to another theory, the proper selection of the direction of cord twist S or Z based upon the particular inclination of the cord itself in the annular body will result in a reduction of the tendency of the cord subelements to experience untwisting, followed by a return to the original twist condition as the particular segment of the cord moves from its ordered annular path as the body is subjected to deflection from said ordered annular path. In the case of a tire, any segment thereof is deflected when that segment is in contact with the ground and consequently bearing the load (or proportion of the load) of the vehicle on which mounted. In the case of a belt, the interior cord is subject to deflection when the particular segment of the belt in which it is embedded passes out of contact with the pulley and again deflects when the cord segment contacts the next pulley and moves through a portion at least of a circular path.

Observation of actual cord constructions composed of twisted-together filaments reveals that there is definitely an increase in the amount of untwisting when the direction of twist of the cord and the inclination of the cord itself with the annular body are not properly matched in the manner described hereinabove. Conversely, with proper matching of these two criteria, observation reveals that deflection will tend to favor a movement to a tighter twist condition which does not shorten the lift of the cord as in the case of the tendency to effect initial untwisting of the cord components.

Figure 6:
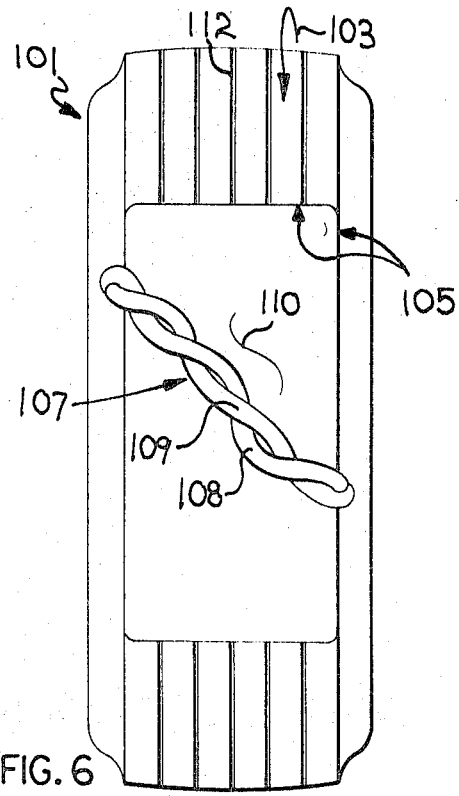

The just previously described phenomena will be more clearly understood by reference to FIGS. 6 through 9 of the drawings. Thus, in FIG. 6, a tire 101 rotating in the direction indicated by the arrow 103 illustrated. For purposes of illustration, the tire is being observed looking up through a pane of glass at the footprint; the tread being broken away on the lines 105 to reveal, for purposes of illustration, a single two-element cord of left-hand inclination. The cord 107 is composed of yarns 108 and 109 combined together in an S-twist whereby the central portion of the spiral schematically illustrated by the S and identified by the reference numeral 110 is nearly crosswise or transverse to the peripheral centerline 112 of the tire. The tire 101 of FIG. 6 is not being deflected, that is, the tire is not under load, whereby the cord 107 has the configuration as illustrated.

Figure 7:
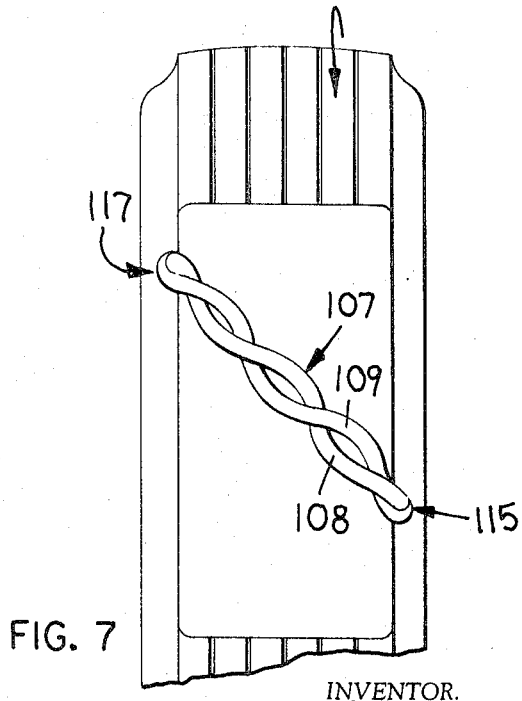

Referring now to FIG. 7, the same tire is shown but it is viewed with the tire under load conditions, In this condition, with the tire rotation as indicated, the segment 115 of the cord 107 will have contacted the road surface before the segment 117. Thus, the segment 115 will have passed from a circular path through an angle and into a straight path parallel with the road surface. This deflection will result in the cord 108 attempting to untwist itself from the yarn 109. Once untwisted, the yarn will revert to the twisted condition illustrated in FIG. 6. This untwisting phenomena followed by the resumption of twist to the original state causes particular strain on the subelements of the yarn or cord.

In contrast, reference to FIG. 8, in which common parts will be identified by the same numerals but in the 200 series rather than the 100 series, reveals the cord 207 which, while of left-hand inclination, features strands 208 and 209 combined to define opposite twist than that of the cord 107 and, in particular, a Z-twist; the center spiral of which is identified by the reference numeral 210 and is fairly closely in alignment with the peripheral centerline 212. The tire 201 in FIG. 8 is an unloaded condition in which the degree of twist in the cord 207 is about the same as the degree of twist in the cord 107.

Figure 9:
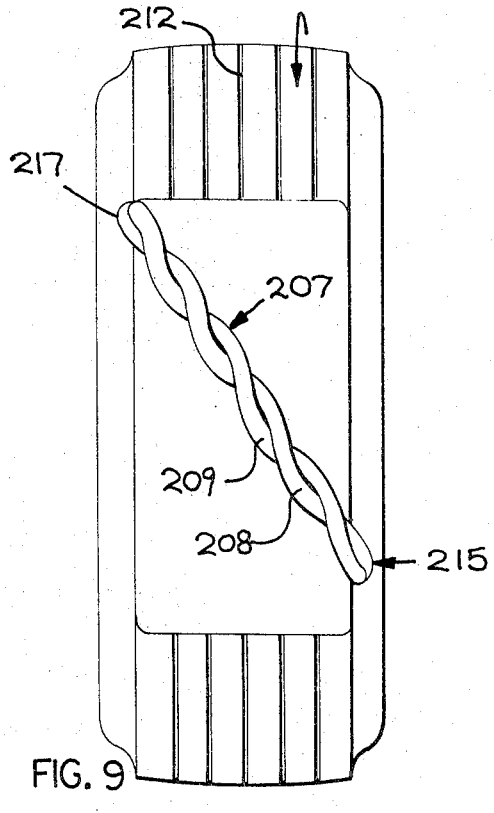

Referring to FIG. 9 with the tire under load wherein the cord has been subjected to deflection with the end segment 215 being distorted prior to the segment 217, we can see that the yarn element 208 in relation to the yarn element 209 has achieved a more tightly twisted configuration than is evident in the cord configuration in FIG. 8. Thus, it can be seen that with a left-hand inclined cord, a Z-twist configuration of the subelements of the cord is preferred to an S-twist cord since the components of the cord, in undergoing deflection, will move simply into a tighter twist condition rather than tending to untwist as illustrated in FIGS. 6 and 7. Conversely, of course, with a right-hand inclined cord, the S-twist configuration or assembly of components would be preferred to the Z-twist yarn or cord.

The particular matching arrangement of the cord body and the particular twist employed, while most applicable to glass, is also of significance with other tire reinforcement materials.

The glass filament component making up the composite yarn or cord is desirably treated to provide protection against interfilament deterioration within the final twisted-together array thereof forming the yarn or cord. The strands and yarns are also desirably treated by an impregnation with an elastomeric composition. The treatment of the fibers preferably occurs as they are drawn from the multiorifice bushing containing the molten glass. In such operation, the plurality of attenuated filaments are sprayed with a liquid containing an anchoring agent, for example, an amino silane, such as gamma-aminopropyltriethoxy silane; a mercapto substituted organoalkoxy silane; a glycidoxy silane, such as gamma-glycidoxypropyltrimethoxy silane; or a carboxyl-group and/or unsaturated group containing silane, such as gamma-methacryloxypropyltrimethoxy silane. A Werner-type compound complexed to contain an amino, a carboxyl or other active hydrogen containing organic group may be used as the anchoring agent. A typical size treatment composition for the glass filaments is composed of 0.5—2.0 percent by weight of gamma-aminopropyltriethoxy silane, 0.3—0.6 percent by weight of a lubricant and the remainder of water. When the filaments assembled in the strand form are dried and combined with like strands (each composed of 204 to 408 and up to 2,000 filaments) to yield the ultimate yarn desired for the particular reinforcement application, said yarn is impregnated by passing it through an impregnant bath. A suitable impregnant is composed of 60—40 parts by weight of a 38-percent dispersed-solids system including a butadiene-styrene-vinyl pyridine terpolymer latex, a butadiene styrene latex and the resorcinol-formaldehyde resin dispersed in 39 parts by weight of water. A commercially available product which has been employed as an impregnant bath is marketed by Uniroyal under the trade name "Lotol 5440."

The impregnation may be practiced in any one of several ways. The final yarn or cord may be impregnated or the strands or plurality of strands may be impregnated, followed by a plying up of the impregnated strands to form the ultimate yarn or cord structure desired. The impregnated strand or yarn is dried usually at a temperature of several hundred degrees for a sufficient time as to remove the tackiness of the yarn or cord but avoiding complete vulcanization or cure of the elastomer, reserving same for the vulcanization or cure of the ultimate product in which the impregnated cord is present as a reinforcement.

The combination of size and impregnant yields a yarn or cord structure in which the individual plurality of filaments are essentially isolated, one from the other. Furthermore, the size pretreatment provides an anchoring substance having an affinity for the glass and at the same time having an affinity for the impregnant which in turn is vulcanizably compatible with the elastomeric matrix of the product involved.

The employment of the orientation and complementary matching of the cord disposition and the selection of cord twist direction, in combination with the size and impregnation treatment, yields the optimum in the achievement of the potential and inherent properties of the glass filament.

The proper selection of cord inclination and cord twist is believed particularly significant considering that a glass filament is, in effect, a column which in an appreciably short length is extremely stiff. Accordingly, an arrangement which causes forces and stresses to be exerted along the longitudinal axis, or as closely in line with the longitudinal axis as can be arranged, are of greater significance than in the case of the conventional flexible filament materials, such as nylon, rayon and the like.

It is also significant in considering the phenomena involved that the amount of twist generally employed in the combining of the glass filaments and strands into ultimate yarn or cord is considerably less than the number of twists (usually expressed as twists per linear inch) employed in the organic materials. Thus, with the conventionally used organic yarn reinforcements, twists of 10, 16, 20 and higher are not too unusual. On the other hand, in the plying up of filaments and strands formed of continuous glass filaments, the number of twists employed ranges anywhere from 1 to 4 and, in most cases, not over 10.

Modifications may be resorted to without departing from the spirit and scope of the present invention as defined in the appended claims.

I claim:

1. A tire construction including an elongate, flexible yarnlike reinforcement disposed interiorly thereof, said yarn being inclined with respect to the longitudinal axis of said tire body as viewed exteriorly thereof, and said yarnlike reinforcement including a twisted-together plurality of glass filaments, said twisted glass filaments defining a spiral, the direction of the slope of the central portion of which spiral taken with respect to the axis of said elongate reinforcement is generally opposite to the angle of inclination of said yarn taken with respect to the axis of said tire body.

2. A tire construction as claimed in claim 1, wherein the direction of the slope of the central portion of said spiral is inclined to the left with respect to the yarn axis (an S-twist) when the yarn itself is inclined to the right with respect to the longitudinal axis of said annular body and is inclined to the right with respect to the yarn axis (a Z-twist) when the yarn itself is inclined to the left with respect to the longitudinal axis of said annular body.

3. The invention as claimed in claim 2, wherein said yarnlike reinforcement proceeds in repeated side-by-side spiral disposition generally longitudinally of said body.

4. The invention as claimed in claim 3, wherein the amount of twist in said yarnlike reinforcement ranges from about 1 to about 10 twists per inch.

5. The tire construction as claimed in claim 1, wherein said yarnlike reinforcement is present as (a) a plurality of mutually parallel cords defining a first carcass ply, (b) a further plurality of mutually parallel cords defining a second carcass ply contiguous to said first carcass ply and the cords in said first ply are oppositely inclined to the cords in the second ply while the direction of twist in each of said cords in said plies are such that the slope of the central portion of the spiral defined by the twist is opposite to the inclination of the cords in the respective plies.

6. The tire construction as claimed in claim 1, wherein said yarnlike reinforcement constitutes the mutually parallel cords in adjacent belt plies, said plies featuring cords of opposite inclination to the peripheral centerline of said tire and said cords feature a twist direction such that the spiral inherent in the twist defines a slope having a central portion which is oppositely inclined to the cord angle with the peripheral centerline.

7. In a tire construction including an interior, elongate yarn or cord reinforcement, said yarn or cord being formed of twisted-together glass filaments and being of either right-hand or left-hand disposition with respect to the equatorial centerline of said annular body as viewed exteriorly thereof; the improvement wherein the slope of the central portion of the spiral inherent in a given twist, S or Z, and the inclination of the yarn are generally opposite.

8. In a tire construction containing an interior reinforcement in the form of an elongate, flexible yarn or cord including a twisted-together assembly of glass filaments, said body being designed for rotation in such manner that the path described by any given segment during rotation includes a departure from circular; the improvement wherein the angular disposition of said reinforcement yarn or cord member with respect to the peripheral centerline of said annulus and the direction of twist, S or Z, of the subelements of said cord members are preselected in combination as to provide a minimum of untwisting of said cord glass filaments as said body rotates.

9. The invention as claimed in claim 8, wherein the twisted-together glass filaments define an amount of twist ranging from about 1 to about 10 twists per inch.

10. In a tire construction composed generally of wheel engaging means, a connected toroidal carcass and a ground engaging tread carried at the crown of said carcass, said tire including interiorly thereof a plurality of reinforcing plies each including mutually parallel cords composed of twisted-together filaments of glass, said cords in adjacent plies being oppositely inclined; the improvement wherein the cords in adjacent plies are of opposite twist.

11. The tire construction as claimed in claim 10, wherein the cords of left-hand inclination with respect to the peripheral centerline, as viewed from the tread side of the carcass, employ a Z-twist while the carcass ply cords of right-hand inclination with respect to the peripheral centerline employ an S-twist.

12. In a tire construction subject to deflection during rotation, said body containing an interior cord reinforcement extending circumferentially in repeated spirals through said body at an angle to the longitudinal or circumferential axis of said body, said cord including a twisted-together plurality of glass filaments; the improvement wherein said cord, when of left-hand inclination, features of a Z-twist configuration of filaments and, when of right-hand inclination, features an S-twist configuration of filaments.

13. The tire construction as claimed in claim 12, wherein the amount of twist of said filaments ranges from about 1 to about 10 twists per inch.